US012587816B2

(12) United States Patent
Naik et al.

(10) Patent No.: US 12,587,816 B2
(45) Date of Patent: Mar. 24, 2026

(54) SYSTEM FOR IMPLEMENTING PHYSICAL LAYER OPERATIONS AS MICROSERVICES IN A MOBILE NETWORK

(71) Applicant: TEJAS NETWORKS LIMITED, Bengaluru (IN)

(72) Inventors: Parag Balwant Naik, Bengaluru (IN); Anindya Saha, Bengaluru (IN); Makarand Kulkarni, Bengaluru (IN); Sebastian Gracias, Bengaluru (IN); Pramit Biswas, Bengaluru (IN)

(73) Assignee: TEJAS NETWORKS LIMITED, Bengaluru (IN)

( * ) Notice: Subject to any disclaimer, the term of this patent is extended or adjusted under 35 U.S.C. 154(b) by 332 days.

(21) Appl. No.: 18/527,427

(22) Filed: Dec. 4, 2023

(65) Prior Publication Data

US 2024/0205654 A1     Jun. 20, 2024

(30) Foreign Application Priority Data

Dec. 16, 2022     (IN) ............................. 202241073080

(51) Int. Cl.
*H04W 4/50* (2018.01)
*H04W 24/02* (2009.01)
(52) U.S. Cl.
CPC ............. *H04W 4/50* (2018.02); *H04W 24/02* (2013.01)
(58) Field of Classification Search
CPC ................................. H04W 4/50; H04W 24/02
See application file for complete search history.

(56) References Cited

U.S. PATENT DOCUMENTS

| | | | |
|---|---|---|---|
| 11,805,076 B2 * | 10/2023 | Vadayadiyil Raveendran ............ | H04L 47/822 |
| 11,886,929 B2 * | 1/2024 | Bai ......................... | H04L 67/34 |
| 2021/0072965 A1 * | 3/2021 | Masters .............. | H04L 41/0895 |
| 2022/0225065 A1 * | 7/2022 | Doken ................ | H04L 41/5051 |
| 2022/0237052 A1 * | 7/2022 | Singhal .............. | G06F 9/45533 |
| 2023/0153166 A1 * | 5/2023 | Bawcom ................... | G06F 8/60 718/1 |
| 2023/0231839 A1 * | 7/2023 | Patwardhan ............ | H04L 63/08 726/3 |
| 2023/0289158 A1 * | 9/2023 | Sipcic ....................... | G06F 8/31 |
| 2025/0227030 A1 * | 7/2025 | Svensson ............ | H04L 41/5054 |

\* cited by examiner

*Primary Examiner* — Abdullahi E Salad
(74) *Attorney, Agent, or Firm* — HSML P.C.

(57) ABSTRACT

Various embodiments of the disclosure described a system and method that implements Hi-PHY operations in a mobile network using a microservices-based architecture across a variety of heterogeneous multi-core processing nodes. Further, the system and method facilitate the optimal mapping of microservices to each element (e.g., hardware processing element or the like) of the processing node(s) based on defined optimization targets associated with deployment constraints. The system and method described may enable the portability of Hi-PHY operations by separating the functionality and implementation aspects of each microservice. Further, the system and method enable the scalability of Hi-PHY operations by creating multiple instances of microservices to distribute the processing load efficiently. The system and method described further enable the dynamic implementation of Hi-PHY processing chains through the utilization of microservices.

18 Claims, 10 Drawing Sheets

100

200

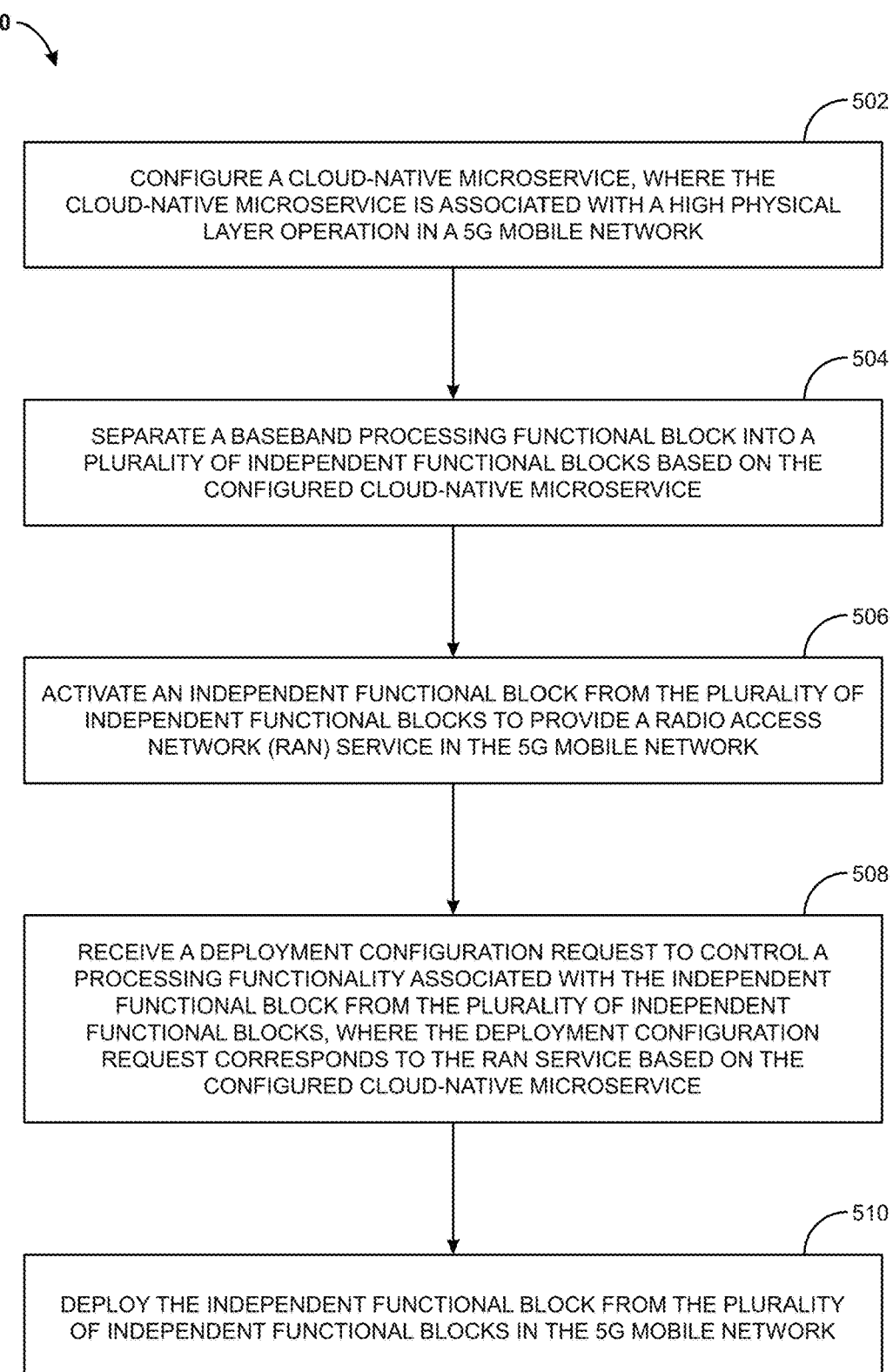

500

502

CONFIGURE A CLOUD-NATIVE MICROSERVICE, WHERE THE CLOUD-NATIVE MICROSERVICE IS ASSOCIATED WITH A HIGH PHYSICAL LAYER OPERATION IN A 5G MOBILE NETWORK

504

SEPARATE A BASEBAND PROCESSING FUNCTIONAL BLOCK INTO A PLURALITY OF INDEPENDENT FUNCTIONAL BLOCKS BASED ON THE CONFIGURED CLOUD-NATIVE MICROSERVICE

506

ACTIVATE AN INDEPENDENT FUNCTIONAL BLOCK FROM THE PLURALITY OF INDEPENDENT FUNCTIONAL BLOCKS TO PROVIDE A RADIO ACCESS NETWORK (RAN) SERVICE IN THE 5G MOBILE NETWORK

508

RECEIVE A DEPLOYMENT CONFIGURATION REQUEST TO CONTROL A PROCESSING FUNCTIONALITY ASSOCIATED WITH THE INDEPENDENT FUNCTIONAL BLOCK FROM THE PLURALITY OF INDEPENDENT FUNCTIONAL BLOCKS, WHERE THE DEPLOYMENT CONFIGURATION REQUEST CORRESPONDS TO THE RAN SERVICE BASED ON THE CONFIGURED CLOUD-NATIVE MICROSERVICE

510

DEPLOY THE INDEPENDENT FUNCTIONAL BLOCK FROM THE PLURALITY OF INDEPENDENT FUNCTIONAL BLOCKS IN THE 5G MOBILE NETWORK

SYSTEM FOR IMPLEMENTING PHYSICAL LAYER OPERATIONS AS MICROSERVICES IN A MOBILE NETWORK

CROSS-REFERENCE

This application claims priority to an Indian Provisional Patent Application No. 202241073080, titled "CLOUD NATIVE MICROSERVICES FRAMEWORK FOR RAN," filed Dec. 16, 2022, all of which is hereby incorporated by reference in its entirety.

FIELD

The present disclosure relates to implementing operations or functions in a wireless communication system and, more particularly, related to a method and a system for implementing high physical layer (Hi-PHY) operations of a radio access network (RAN), as defined in O-RAN specifications, using a cloud-native microservices framework.

BACKGROUND

A physical layer (or Layer 1) is the lowermost function in an Open Systems Interconnection (OSI) protocol stack responsible for transmitting signals on a physical medium. The physical layer (or Layer 1) may include compute-intensive processing operations or functions that may need specialized support from the underlying hardware for the execution of operations. A general-purpose computing resource may need more capabilities to perform the processing functions/operations in real-time efficiently to meet the stringent processing requirements. Therefore, such operations or functions may be executed on multiple computing resources with specialized instruction set architecture (ISA) or connected with hardware devices.

In an embodiment, the physical layer function handles (or manages) the lowermost layer processing, typically called baseband processing. Further, baseband processing has traditionally been designed as tightly knit software modules tailor-made or custom hardware for digital signal processing applications. Conventional physical layer implementations on Commercially Off-The-Shelf (COTS) hardware or otherwise necessitate a tight integration between several components of the physical layer function as well as the hardware and the software, due to implementation limitations (e.g., sharing data across hardware components using shared memories) or for meeting stringent optimization constraints, thus rendering the software development efforts on hardware platform almost unusable on one of a different kind. Implementations on COTS hardware are marred with inefficiencies in terms of power utilization due to additional hardware logic present on them to cater to operations not specific to the task at hand. Therefore, implementing operations that have deployment flexibility and provide freedom to use the computing resources based on real-time needs and availability, may be challenging.

FIG. 1 is an illustration showing a Physical Downlink Shared Channel (PDSCH) processing chain (100) in the physical layer of a mobile network, according to a prior art implementation. FIG. 1 shows that multiple processes are involved, and the functions or operations may be interlinked. The various functions may include a Cyclic Redundancy Checks (CRC) attachment process, a Low-Density Parity Check (LDPC) base graph selection process, a code block segmentation and CRC attachment process, a LDPC encoding process, a rate matching process, a code block concatenation process, a scrambling process, a modulation operation process, a layer mapping process, an antenna port mapping process, and mapping to resource blocks (RBs) process.

FIG. 2 is an illustration showing a signal chain implementation (200) for the PDSCH channel in the physical layer of the mobile network, according to a prior art implementation. FIG. 2 is described in conjunction with FIG. 1 and is also illustrative of the prior art. FIG. 2 shows a typical execution of the operations associated with the PDSCH channel in a software functionality that would involve the following:

1. RPC from each processing function to another function (e.g., CRC attachment to LDPC base graph selection). These RPCs may invoke the function representing the next processing directly or through a messaging system.
2. The passing of transformed data from one stage to another may be achieved by creating new data buffers that may be allocated dynamically or during system initialization, and each stage then releases these buffers to enable processing by the next stage.
3. Updating of state variables used as global system context so that the entire signal chain of processing is synchronized.

While there are several possibilities in terms of how the above three functions are achieved, they still suffer from the following drawbacks when utilized in an existing cloud-native architecture:

1. Non-standard interfaces between each stage lead to tight coupling between the functional blocks,
2. Even if the interfaces get standardized, the reliance of the implementation on an assumed state of the other block means that there is not enough decoupling,
3. Scaling of the individual blocks according to specific deployment conditions is not possible without explicit modification of logic and codes and
4. It is difficult to synchronize states across the functional blocks when implemented in heterogeneous environments as they exist today.

The limitations and disadvantages of conventional approaches will become apparent to one of skill in the art through the comparison of described systems with some aspects of the present disclosure, as set forth in the remainder of the present application and with reference to the drawings.

SUMMARY

A system and method for implementing a high physical (Hi-PHY) layer operation in a mobile network, are described. In an aspect, the system and method include configuring one or more cloud-native microservices associated with one or more Hi-PHY operations in the mobile network. Further, based on the configuration, a baseband processing functional block may be segregated or separated into multiple independent functional blocks. From the independent multiple functional blocks, one or more independent functional blocks may be instantiated to provide RAN functions or operations in the mobile network. Upon activation, a deployment configuration request may be received. The deployment configuration may be associated with the controlling of a processing functionality of the independent functional block. Further, the independent functional block may be deployed based on the received deployment configuration. Further, the deployed independent functional block may be executed to provide the Hi-PHY operation in the mobile network.

For instance, the system and method described may include segregating Hi-PHY operations into several independent cloud-native microservices. Based on the deployment configuration, each microservice may be independently deployed on any of the diverse processing elements. For example, the processing elements may correspond to hardware elements such as general-purpose processors, application-specific processors, field programmable gateway arrays (FPGA), graphic processing units (GPU), neural processing units (NPU), application-specific integrated circuits (ASIC), etc. In an embodiment, upon deployment, the functional blocks may execute to provide the Hi-PHY functionalities.

In an embodiment, a service management and orchestrator (SMO) engine may execute operations that may include configuring cloud-native microservices. For instance, this may include instantiating a setting of platform runtime system (PRS) configuration between the SMO engine and a Platform Management (PM) engine. Further execution of operations may include receiving a status indicating success or failure of the setting PRS configuration from the PM engine. Further execution of operations may include receiving a deployment artifact for a containerized workload at the SMO engine upon instantiating an inventory update at the SMO engine. Further execution of operations may include instantiating a network function (e.g., a containerized network function (CNF) or a virtualized network function (VNF)) request from a deployment management (DM) engine based on the received deployment artifact. Further execution of operations may include sending a set PRS configuration request to the PM engine, such that the PM engine forwards the PRS configuration request to the PM engine. Further execution of operations may include receiving a set PRS configuration response from the PM engine, such that the PM engine receives the set PRS configuration response from the PM engine based on the PRS configuration request. Further execution of operations may include receiving a network function (NF) instantiated response success message from the DM engine when the DM engine initiates the NF instantiation via a network function engine. In an embodiment, the DM engine may create profile instances, chain the profile instances, and instantiate the flow of events for the Hi-PHY layer operation at the DM engine.

In an embodiment, configuring one or more cloud-native microservices includes creating a deployment artifact with one or more details associated with the cloud-native microservice. Further, steps of configuration may include deploying one or more images to be processed by the SMO engine based on the created deployment artifacts, analyzing the deployment artifact to determine a deployment node using the DM engine, and deploying the image with the cloud-native microservice, using the DM engine, based on the analysis to configure the one or more cloud-native microservices.

In an embodiment, configuring the cloud-native microservice includes determining the Hi-PHY operation based on a requirement of an operator, deploying the Hi-PHY operation using an optimal usage of one or more resources, and configuring one or more cloud-native microservices based on the determined Hi-PHY operation and the one or more deployed Hi-PHY operation.

In an embodiment, one or more baseband processing functional blocks may be associated with one or more of a physical downlink shared channel (PDSCH), a PDSCH demodulation reference signals (PDSCH DMRS), a physical downlink control channel (PDCCH), a PDCCH DMRS, a physical broadcast channel (PBCH), a primary synchronization signal (PSS), a secondary synchronization signal (SSS), a channel state information reference signal (CSI-RS), and a phase tracking reference signal (PT-RS).

In an embodiment, the processing functionality block associated with the independent functional block is controlled by receiving channel information and dynamically controlling the processing functionality block associated with the independent functional block.

In an embodiment, dynamically controlling the processing functionality block associated with the independent functional block comprises creating the processing functionality block associated with the independent functional blocks, deleting the processing functionality associated with one or more independent functional blocks, and scaling the processing functionality associated with the independent functional block.

In an embodiment, the multiple independent functional blocks are stateless.

In an embodiment, the independent functional blocks from the multiple independent functional blocks communicate with each other through an application programming interface (API).

In an embodiment, the system and method include defining one or more interfaces, enabling data transport among the plurality of independent functional blocks. Further, the method includes controlling copying data across devices and maintaining data coherence. The interface may correspond to a logical interface (e.g., First In, First Out (FIFO) interface, queue interface, or the like) that may provide application programming interfaces (APIs) (e.g., send API, receive API, get API, put API, or the like). The actual mapping of the APIs on the underlying hardware is dependent on a software platform. For example, the DMA may be configured to provide operations as an interface. Further, interfaces may also include, for example, shared memory or socket, etc.

In an embodiment, the independent functional block from the plurality of independent functional blocks is deployed in the mobile network deployment node.

For example, a cloud computing infrastructure (e.g., a cloud computing platform that includes physical infrastructure nodes that may meet O-RAN requirements) may include a set of clusters, such that each cluster may include several nodes, and the deployment node is a node in the cluster. In an embodiment, the system and method may execute an integer linear programming algorithm or a heuristic algorithm by applying certain constraints. For instance, when solving an optimization problem by applying or enforcing such constraints, the node that is available for deployment (e.g., a deployment node) may be determined based on the available nodes. For example, upon such determination, the deployment node may be selected as the best node based on certain deployment criteria.

For example, consider a scenario that may include two nodes: a first node with an FPGA accelerator and a second node without the FPGA accelerator. Now, consider an implementation of a data flow diagram (DFG) of certain operations or functions that may execute at 100 MHz. The implementation may be available for execution on both types of nodes, but the number of cores used for the execution would be different (e.g., more without the FPGA). However, if the criteria are to reduce the count of cores for the execution of operations, the platform may select the first node with the FPGA accelerator connected to it. Similarly, suppose the operations are implemented to be executed in a 5 MHz cell. In that case, the platform may select the second node, which is without the FPGA accelerator, as using the first node with the FPGA accelerator may result in high power consumption and less gain.

In an embodiment, an SMO engine may be provided for implementing Hi-PHY operations in the mobile network. The SMO engine configures the cloud-native microservice. The cloud-native microservice is associated with the Hi-PHY operation in the mobile network. Further, the SMO engine disintegrates the baseband processing functional block into multiple independent functional blocks based on the configured cloud-native microservice.

Further, the SMO engine may instantiate an independent functional block from the multiple independent functional blocks to implement the execution of the RAN service or RAN operation or RAN function in the mobile network. Further, the SMO engine receives a deployment configuration request to control a processing functionality associated with the independent functional block, wherein the deployment configuration request includes the RAN service based on the configured cloud-native microservice. Further, the SMO engine deploys the independent functional block in the mobile network.

These and other features and advantages of the present disclosure may be appreciated from a review of the following detailed description of the present disclosure, along with the accompanying figures in which the same reference numerals refer to the same parts throughout.

BRIEF DESCRIPTION OF THE DRAWINGS

Various embodiments will be better understood from the following description with reference to the drawings in which:

FIG. 5 is a flow chart illustrating a process for implementing a Hi-PHY operation in the mobile network, according to an exemplary embodiment.

Figure 1:
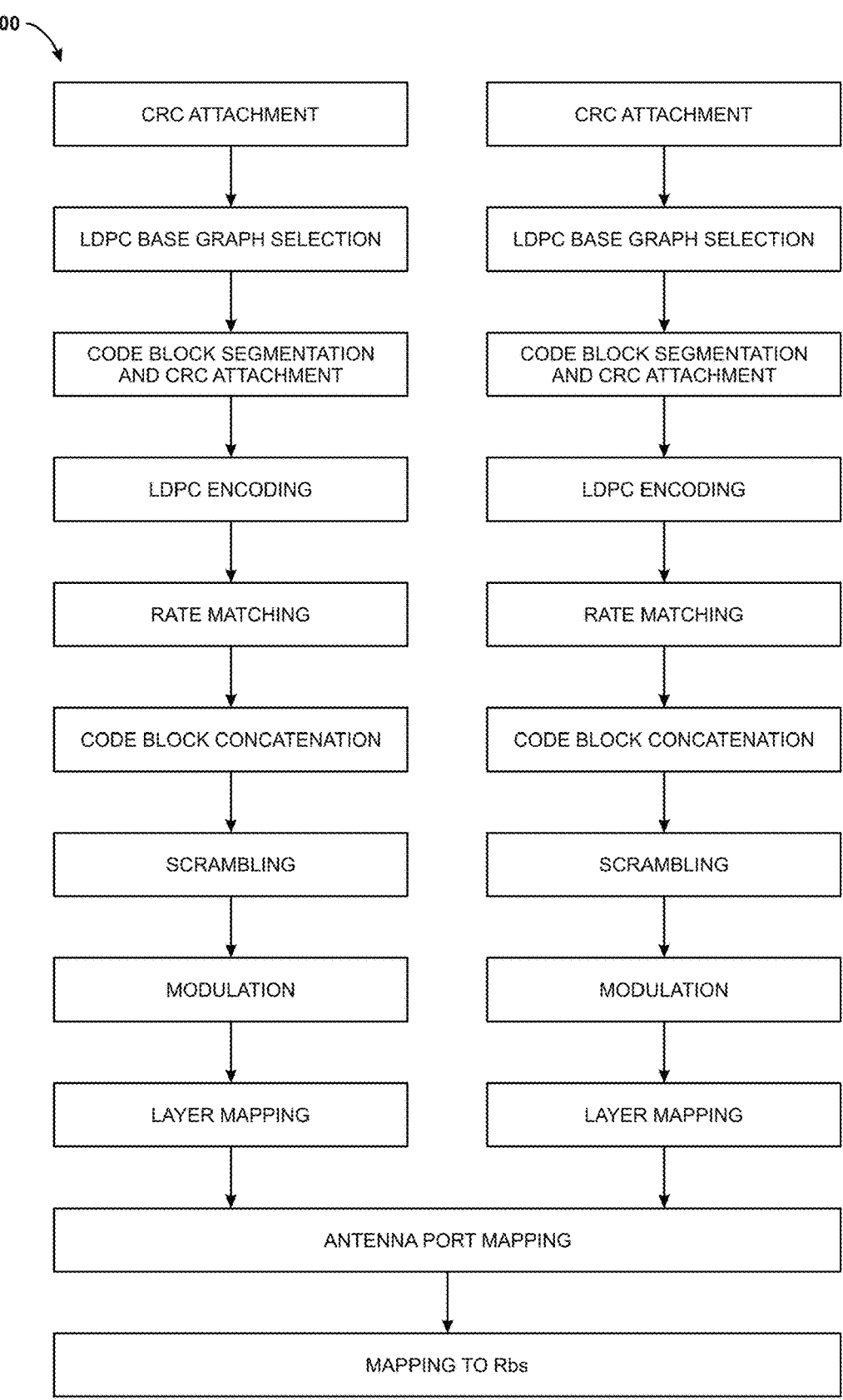
FIG. 1 is an illustration showing a Physical Downlink Shared Channel (PDSCH) processing chain in the physical layer of a mobile network, according to a prior art implementation.
Figure 2:
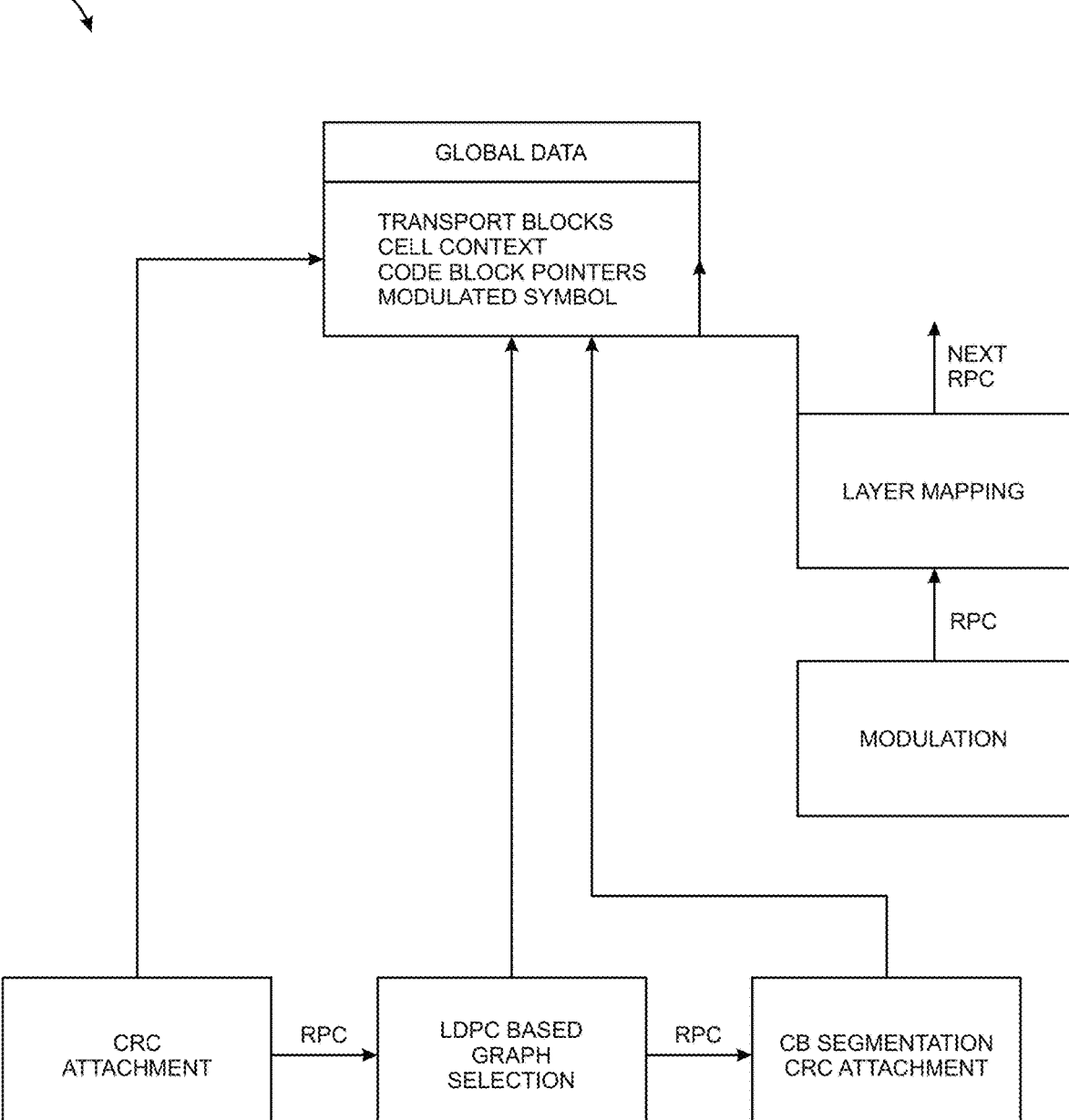
FIG. 2 is an illustration showing a signal chain implementation for the PDSCH channel in the physical layer of the mobile network, according to a prior art implementation.

It may be noted that to the extent possible, for example, reference numerals have been used to represent elements in the drawing. Further, those of ordinary skill in art will appreciate that elements in the drawing are illustrated for simplicity and may not have necessarily been drawn to scale. For example, the dimension of some of the elements in the drawing may be exaggerated relative to other elements to help improve understanding of aspects of the present disclosure. Furthermore, conventional symbols may have represented one or more elements in the drawing. The drawings may show only those specific details pertinent to the understanding of the embodiments of the present disclosure so as not to obscure the drawing with details that will be readily apparent to those of ordinary skill in the art having the benefit of the description herein.

DETAILED DESCRIPTION

These and other aspects of various embodiments will be better appreciated and understood in conjunction with the following description and the accompanying drawings. It should be understood, however, that the following descriptions, while indicating various embodiments and numerous specific details thereof, are given by way of illustration and not of limitation. Many changes and modifications may be made within the scope of the various embodiments without departing from the spirit thereof, and the various embodiments herein and the appended claims include all such modifications.

The embodiments described in the subject specification are illustrated with the accompanying drawings, throughout which reference letters indicate corresponding parts in the various figures. As used in this specification, the phrase "at least one of A, B, and C" includes within its scope "only A," "only B," "only C," "both A and B," "both B and C," "both A and C," and "all of A, B, and C."

The embodiments described and the various features and advantageous details are explained more fully with reference to the non-limiting embodiments illustrated in the accompanying drawings and detailed in the following description. Descriptions of well-known components and processing techniques are omitted to avoid unnecessarily obscuring the embodiments. The examples used are intended merely to facilitate an understanding of how the embodiments can be practiced and to enable those of skill in the art further to practice the embodiments. Accordingly, the examples should not be construed as limiting the embodiments' scope.

In an implementation, the terms software components or components, software routines or routines, software models or models, software engines or engines, software scripts or scripts, and layers are used interchangeably throughout the subject specification unless context warrants distinction(s) amongst the terms based on implementation. The implementation primarily involves executing computer-readable code, such as a sequence of instructions, by a processor of a computing device (e.g., a special-purpose computer, a general-purpose computer, or a mobile device) in an integrated environment. The computing device may be configured to execute operations of the special-purpose computer when the processor executes the instructions stored in the memory of the computing device. The execution of specific operations enables the computing device to execute operations as the special purpose computer, thereby improving the technical operation of the special purpose computer. The execution of particular functions or operations, individually or in cooperation, may collectively provide a platform, framework, or architecture that implements functions or operations of RAN as microservices. The above models, software components, and software routines may be reused based on the definition and implementation.

In an embodiment, a method is provided for implementing Hi-PHY operation in a mobile network. The method may include configuring a cloud-native microservice. The cloud-native microservice may be associated with a Hi-PHY operation in the mobile network. Based on the configured cloud-native microservice, the method may include splitting or separating a baseband processing functional block into a plurality of independent functional blocks. Further, the method may include activating a separate functional block from the plurality of independent functional blocks to provide a RAN service in the mobile network. Based on one or more configured cloud-native microservices, the method may include receiving a deployment configuration request to control a processing functionality associated with the independent functional block. The deployment configuration request may correspond to the RAN service. Further, the method may include deploying the independent functional block from the plurality of independent functional blocks in the mobile network.

In an embodiment, the method may include a cloud-native microservice calling an individual functional block based on a requirement. The cloud-native microservice may fix application programming interfaces (APIs) to access functionality, where the cloud-native microservice is stateless to enable scaling execution of operations or functions on demand. The cloud-native microservice may not depend on the states of other microservices to perform a particular task correctly. The cloud-native microservice can be created, deleted, or scaled independently of other microservices to implement the Hi-PHY operations in the mobile network effectively without wasting resources.

In an embodiment, the described method may be used to implement Hi-PHY operations in the mobile network using a microservices-based architecture across a variety of heterogeneous multi-core processing nodes. The method facilitates the optimal mapping of microservices to each element (e.g., hardware processing element or the like) of the processing node(s) to meet the defined optimization targets associated with deployment constraints. It also supports the portability of Hi-PHY operations by separating the functionality and implementation aspects of each microservice. Additionally, this method enables the scalability of Hi-PHY operations by creating multiple instances of microservices to distribute the processing load efficiently. It further enables the dynamic implementation of Hi-PHY processing chains through the utilization of microservices.

Referring now to the drawings, and more particularly to FIG. 3 through FIG. 10, various embodiments are shown, where the same reference numerals denote corresponding features consistently throughout the figures.

Figure 3:
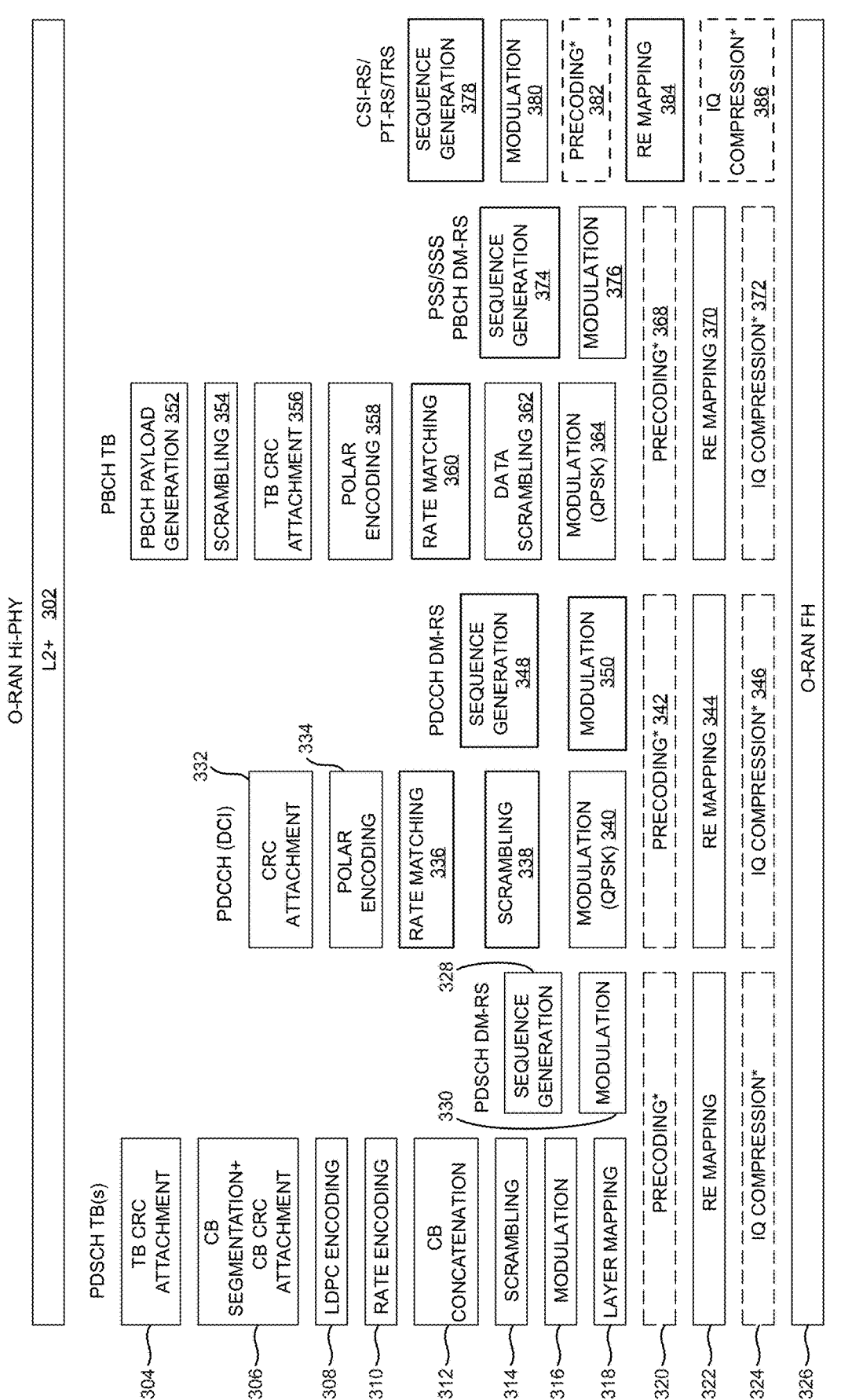
FIG. 3 is an illustration showing certain operations or functions executed at an Open Radio Access Network high physical layer (O-RAN Hi-PHY), according to an exemplary embodiment.

FIG. 3 is an illustration showing certain operations or functions executed at an O-RAN Hi-PHY, according to an exemplary embodiment. In an embodiment, functions or operations of radio access network (RAN) may be virtualized and deployed as virtualized radio access network (vRAN) deployments. The vRAN deployments may further enable the implementation of hardware functionalities via logical routines (e.g., software routines, software modules, or the like), thereby virtualizing the operations executed by the RAN. Further, the vRAN deployments may virtualize network functions and provide a flexible architecture for implementing operations of the RAN on platforms (e.g., software platforms or the like) using general-purpose processors (GPPs). The vRAN deployments based on technical standards and specifications, for example, an open RAN (O-RAN), may distinctly segregate a distributed unit's (DU) operations. In an implementation, a lower layer of the DU may execute operations or functions of a physical (PHY) layer, a medium access control (MAC) layer, a radio link control (RLC), and a packet data convergence protocol (PDCP).

Typically, the operations of the PHY layer and the MAC layer may include a modulation operation, a demodulation operation, a scrambling operation, a descrambling operation, a channel estimation operation, a pre-coding operation, an equalization operation, a packet processing operation, and a scheduling operation. The distinct segregation of the operations or functions of the distributed unit (DU) may include a lower physical (Low-PHY) layer operation and a higher physical (Hi-PHY) layer operation. In an embodiment, the functions, or operations of the PHY layer facilitate the processing of the lowermost layer (typically referred to as baseband processing). Different computing resources may execute a signal chain, including the functions or operations related to the baseband processing. For example, the computing resources may include general purpose processors (GPPs), field programmable gate arrays (FPGAs), graphical processing units (GPUs), single core or multicore central processing units (CPUs), network accelerator cards, etc. In an embodiment, the functions or operations of the MAC Layer may be decomposed into microservices to improve a system's capacity. Such a mechanism of decomposition of the operations or functions of the MAC layer may use techniques like those in Vector Packet Processing (VPP).

Referring to FIG. 3, a signal processing chain is shown that may include the operations or functions of the O-RAN Hi-PHY (e.g., L2+ 302). For example, such operations or functions may include a physical downlink shared channel (PDSCH) operation, a physical downlink control channel (PDCCH) operation, a physical broadcast channel (PBCH) operation, a primary synchronization signal (PSS)/secondary synchronization signal (SSS) operation, a channel state information reference signal (CSI-RS) operation, a phase tracking reference signal (PT-RS) operation, etc. For instance, let us consider a signal chain processing of a downlink (DL) PDSCH that may include multiple sub-functions or sub-operations (e.g., 304, 306, 308, 310, 312, 314, 316, 318, 320, 322, and 324). In an embodiment, each operation or sub-operation, functions, or sub-functions (e.g., 304, 306, 308, 310, 312, 314, 316, 318, 320, 322, and 324) in the O-RAN Hi-PHY may be decomposed into independent functional blocks and implemented as microservices.

In an embodiment, the functions or operations corresponding to any workload that can be modeled as a Data flow Graph (DFG) or stream processors (for example) may be implemented as microservices. Each function or operation microservice modeling may be implemented as a hardware component on the ASIC or register transfer level (RTL) executing on the FPGA or a firmware/software executing on general-purpose CPUs or specialized digital signal processing (DSP) functions. For example, the DFG may correspond to a map of the flow of information in the platform or the framework. Each node of the DFG processes input information and generates one or more output sets of information. In applications where data flows as streams, the input and the processed output are streams of different or the same data types. In this context, the nodes of the data flow graph are referred to as the stream processors or transformers since they process (transform) the input stream to generate an output stream at a fixed rate of flow of data tokens.

In an embodiment, a platform or a framework may enable the implementation of the functions or operations of the RAN as individual functional blocks. Such an implementation of the functions or operations may be referred to as microservices. Such microservices' functions or operations provisioned may be accessed via Application Programming Interfaces (APIs). Further, the microservices are stateless, enabling the implementation of scaling existing functions or operations or adding new functions or operations. Additionally, the microservices may eliminate dependencies on other microservices for executing operations or tasks. Further, microservices may enable the creation, deletion, or scaling of specific functions or operations implemented as microservices independently of other microservices.

In an embodiment, the platform may enable separating functions or operations of a physical layer (radio network, spectrum, compute, storage, transport block (TB) operation, cyclic redundancy check (CRC) attachment operation, Low-Density Parity Check (LDPC) encoding operation, a rate encoding operation, a CB concatenation operation, a scrambling operation, a modulation operation, a layer mapping operation, a precoding operation, a re-mapping operation, and an IQ-compression operation, etc.) from a network (e.g., RAN or the like) that consumes physical layer resources without affecting network operations. In an embodiment, the platform or framework may provide a cloud-native implementation that provides scalability, better fault isolation, and efficient computing resource utilization.

Based on the microservices, a baseband processing functional block is associated with one or more of the PDSCH, a PDSCH DMRS, the PDCCH (DCI), a PDCCH DMRS, a PBCH, a PSS, a SSS, a CSI-RS, and a PT-RS as shown in FIG. 1 (for example).

In an embodiment, the PDSCH (e.g., PDSCH functional block) includes one or more functional block(s), such as a transport block (TB) cyclic redundancy check (CRC) attachment functional block 304, a combination of a CB segmentation and a CB CRC attachment functional block 306, a Low-Density Parity Check (LDPC) encoding functional block 308, a rate encoding functional block 310, a CB concatenation functional block 312, a scrambling functional block 314, a modulation functional block 316, a layer mapping functional block 318, a precoding functional block 320, a re-mapping functional block 322, and an IQ-compression functional block 324. Based on the method described, all functional blocks (e.g., the TB CRC attachment functional block 304, the combination of the CB segmentation and CB CRC attachment functional block 306, the LDPC encoding functional block 308, the rate encoding functional block 310, the CB concatenation functional block 312, the scrambling functional block 314, the modulation functional block 316, the layer mapping functional block 318, precoding functional block 320, the re-mapping functional block 322, and the IQ-compression functional block 324) execute operations independently of each other.

In an embodiment, the TB CRC functional block 304 detects an error in data and information transmitted over the mobile network. For example, the code block (CB) CB segmentation and a CB CRC attachment functional block 306 enable the detection of correctly decoded CB with certainty. For example, the LDPC encoding functional block 308 represents a class of error-correcting codes that can be employed for correcting transmission errors in the mobile network. For example, the rate encoding functional block 310 extracts an exact set of bits to be transmitted within a given Transmission Time Interval (TTI). For example, the CB concatenation functional block 312 may refer to the bit sequences of all the CBs in a CB set connected in series. For example, the scrambling functional block 314 is used to randomize transitions in a transmitted signal by shuffling bits.

In an embodiment, the modulation functional block 316 enables a wireless connection to transmit signals to a longer distance. For example, the layer mapping functional block 318 assists in a process where each codeword is mapped to one or multiple layers. For example, the precoding functional block 320 enables a technique that exploits transmit diversity by weighting the information stream. For example, the re-mapping functional block 322 enables the re-map of the data without error. For example, the IQ compression functional block 324 performs compression processing on the quantized IQ obtained by baseband processing.

In a $3^{rd}$ Generation Partnership Project (3GPP) system, the operations of the TB CRC attachment functional block 304, the combination of the CB segmentation and CB CRC attachment functional block 306, the LDPC encoding functional block 308, the rate encoding functional block 310, the CB concatenation functional block 312, the scrambling functional block 314, the modulation functional block 316, the layer mapping functional block 318, the precoding functional block 320, the re-mapping functional block 322, and the IQ-compression functional block 324 have already been defined.

In an embodiment, consider that the system receives a deployment configuration request to implement a processing functionality associated with the precoding functional block. In this scenario, the system deploys the precoding functional block within the mobile network to provide the service without invoking other processing blocks.

In an embodiment, the operations of the TB CRC attachment functional block 304, the combination of the CB segmentation and CB CRC attachment functional block 306, the LDPC encoding functional block 308, the rate encoding functional block 310, the CB concatenation functional block 312, the scrambling functional block 314, the modulation functional block 316, the layer mapping functional block 318, the precoding functional block 320, the re-mapping functional block 322, and the IQ-compression functional block 324 are known operations in the art.

In an embodiment, when the system receives a deployment configuration request to implement the processing functionality associated with the re-mapping functional block, the system deploys the re-mapping functional block within the mobile network to provide the service without invoking other processing blocks. This will enhance the seamless operation of the mobile network.

In an embodiment, consider that the PDCCH (e.g., PDCCH (DCI) functional block) includes one or more functional block(s) such as a CRC attachment functional block 332, a polar encoding functional block 334, a rate matching functional block 336, a scrambling functional block 338, a modulation functional block 340, a precoding functional block 342, a re-mapping functional block 344, and an IQ-compression functional block 346. Based on the method described, all the functional blocks (such as the CRC attachment functional block 332, the polar encoding functional block 334, the rate matching functional block 336, the scrambling functional block 338, the modulation functional block 340, the precoding functional block 342, the re-mapping functional block 344, and the IQ-compression functional block 346) execute operations independently of each other. The operations of the CRC attachment functional block 332, the polar encoding functional block 334, the rate matching functional block 336, the scrambling functional block 338, the modulation functional block 340, the precoding functional block 342, the re-mapping functional block 344, and the IQ-compression functional block 346 are known in the art. As the operations are well known in the art, for the sake of brevity, we are not explaining the operations again in patent disclosure.

In an embodiment, when the system receives the deployment configuration request to control the processing functionality associated with the re-mapping functional block, the system deploys the re-mapping functional block in the mobile network to receive the service without invoking other processing blocks. This will improve the seamless operations in the mobile network.

In an embodiment, consider that the PDCCH DM-RS (e.g., PDCCH DM-RS functional block) includes one or more functional block(s) such as a sequence generation functional block 348, a modulation functional block 350, the precoding functional block 342, the re-mapping functional block 370, and the IQ-compression functional block 346. Based on the method described, the functional block(s), such as the sequence generation functional block 348, the modulation functional block 350, the precoding functional block 342, the re-mapping functional block 344, and the IQ-compression functional block 346, may execute operations independently of each other.

In another embodiment, consider that the PBCH TB (e.g., PBCH TB functional block) includes one or more functional block(s) such as a PBCH payload generation functional block 352, a scrambling functional block 354, a TB CRC attachment functional block 356, a polar encoding functional block 358, a rate matching functional block 360, a data scrambling functional block 362, a modulation functional block 364, a precoding functional block 368, a re-mapping functional block 370, and an IQ-compression functional block 372. Based on the method described, all the above-described functional blocks may execute operations independently of each other.

In an embodiment, consider that the PSS/SSS PBCH DM-RS (e.g., PSS/SSS PBCH DM-RS functional block) includes one or more functional block(s) such as a sequence generation functional block 374, a modulation functional block 376, the precoding functional block 368, the re-mapping functional block 370, and the IQ-compression functional block 372. Based on the method described, all the above-described functional blocks may execute operations independently of each other.

In an embodiment, consider that the CSI-RS/PT-RS/TRS (e.g., CSI-RS/PT-RS/TRS functional block) includes one or more functional block(s) such as a sequence generation functional block 378, a modulation functional block 380, a precoding functional block 382, a re-mapping functional block 384, and an IQ-compression functional block 386. Based on the method described, the above-described functional blocks may execute operations independently of each other. In an embodiment, FIG. 3 also shows the O-RAN front haul (FH) that facilitates the execution of further operations in the mobile network.

Figure 4:
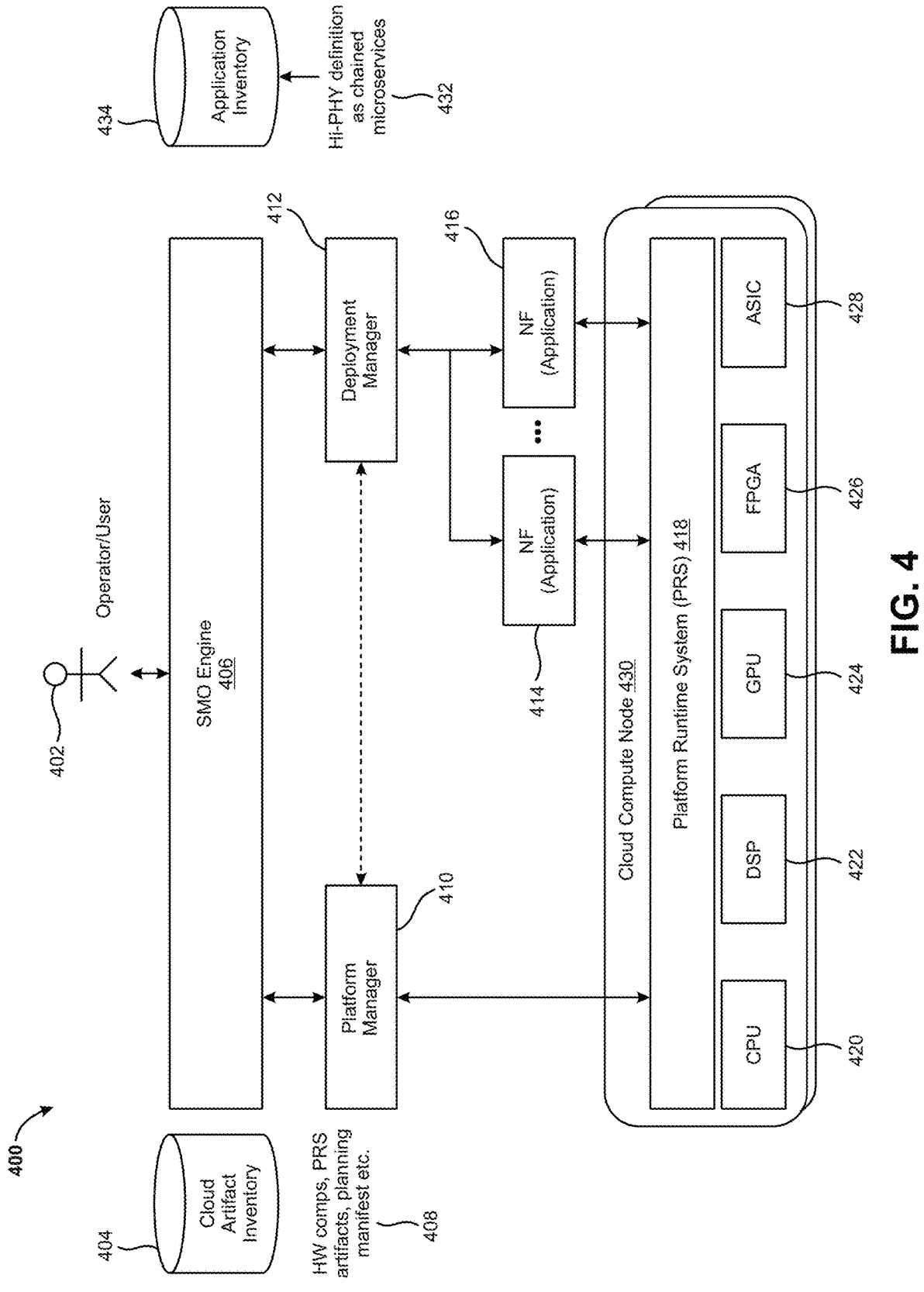
FIG. 4 is an illustration showing a system for implementing Hi-PHY operations in the mobile network, according to an exemplary embodiment.

FIG. 4 is an illustration showing a system 400 for implementing the Hi-PHY operations in the mobile network, according to an exemplary embodiment. In an embodiment, the user or operator 402 may use the services provided by the mobile network. The system 400 includes a communicatively coupled arrangement of service management and orchestration (SMO) engine 406, platform management engine 410, deployment management engine 412, network function applications (e.g., 414, 416, etc.), and a cloud compute note 430. The cloud compute node 430 may further include a platform runtime system (PRS) 418 and the nodes. For example, the nodes may include hardware or computing elements such as CPU, DSP, GPU, FPGA, ASICs, etc. deployment 406. The cloud artifact inventory 404 may store information related to the artifacts (e.g., HW compos, PRS artifacts, planning, manifest, etc. 408). The application inventory 434 may store information related to Hi-PHY definitions as chained microservices 432, as shown in FIG. 4.

In an embodiment, the SMO engine 406 may receive various details, such as hardware components, PRS artifacts, planning, manifests, etc. (e.g., 408). The PM engine 410 may communicate with the SMO engine 406 via an interface. The deployment manager 412 may communicate with the SMO engine 406 via another interface. Further, the PRS 418 may enable interfacing with multiple computing resources or nodes. For example, multiple platform applications may instantiate and configure accelerator profiles and provide transport abstraction to enable the application to invoke the accelerator's capabilities at runtime. The common operations/actions/events are implemented in the accelerator applications.

In an embodiment, the SMO engine 406 instantiates a setting of PRS configuration between the SMO engine 406 and the platform manager 410. Further, the SMO engine 406 receives a status of success or failure of the setting of the PRS configuration from the PRS 418. Further, upon instantiating an inventory update, the SMO engine 406 receives a deployment artifact for a containerized workload or a virtualized workload at the SMO engine 406. Further, based on the received deployment artifact, the SMO engine 406 instantiates a network function (NF) request to the deployment manager 412. In an embodiment, the NF request may be a containerized network function (CNF) or a virtualized network function (VNF). Further, the SMO engine 406 may receive the NF instantiated response success message from the deployment manager 412 when the deployment manager 412 initiates the NF instantiation via the network function engine (not shown). The deployment manager 412 creates profile instances, chains the profile instances, and instantiates a flow of events for one or more Hi-PHY operations.

In an embodiment, the SMO engine 406 creates deployment artifacts associated with the cloud-native microservice. Further, the SMO engine 406 deploys an image to be processed. The SMO engine 406 may also analyze the created deployment artifact to determine a deployment node using the deployment manager 412. Further, based on the analysis, the SMO engine 406 may deploy the image with the cloud-native microservice using the deployment manager 412.

In an embodiment, the SMO engine 406 executes operations to determine the Hi-PHY operation based on the requirement of an operator. Further, the SMO engine 406 may deploy the Hi-PHY operation using an optimal usage of a resource (e.g., bandwidth, memory usage, or the like). Further, the SMO engine 406 configures the cloud-native microservice based on one or more determined Hi-PHY operations and the deployed Hi-PHY operation.

Based on the configured cloud-native microservice, the SMO engine 406 disintegrates the baseband processing functional blocks into multiple independent functional blocks. The baseband processing functional blocks may be associated with the PDSCH, the PDSCH DMRS, the PDCCH, the PDCCH DMRS, the PBCH, the PSS, the SSS, the CSI-RS, and the PT-RS. The multiple independent functional blocks are stateless. In an embodiment, an independent functional block from the multiple independent functional blocks may communicate with each other through the API. The independent functional block is deployed in a deployment node in the mobile network.

In an embodiment, the system and method may implement the execution of operations of Hi-PHY based on the integer linear programming algorithm or a heuristic algorithm to solve constrained equations. By solving an optimization problem using these constrained equations, the deployment node is determined based on the available nodes. In other words, the deployment node is selected as the best node based on certain deployment criteria. For example, consider two nodes: one with an FPGA accelerator and the other without it. Now, let us consider a DFG that runs at 100 MHz. The implementation may be available for execution on both types of nodes, but the number of cores used for the execution would be different (e.g., more without the FPGA). However, if the criteria are to reduce the count of cores for the execution of operations, the platform may select the first node with the FPGA accelerator connected to it. Similarly, suppose the operations are implemented to be executed in a 5 MHz cell. In that case, the platform may select the second node, which is without the FPGA accelerator, as using the first node with the FPGA accelerator may result in high power consumption and less gain.

In an embodiment, the processing functionality block associated with the independent functional block is controlled by receiving channel information and dynamically controlling the processing functionality block associated with the independent functional block. In an embodiment, the SMO engine 406 creates the processing functionality block associated with the independent functional block, and/or deletes the processing functionality associated with the independent functional block, and/or scales the processing functionality associated with the independent functional block.

Further, the SMO engine 406 determines which independent functional block to activate to provide the RAN functions or operations in the mobile network. Further, the SMO 406 engine receives a deployment configuration request to control the processing functionality associated with the independent functional block. The deployment configuration request corresponds to the RAN function or operation based on the configured cloud-native microservice. Further, the SMO engine 406 deploys the independent functional block in the mobile network.

Further, the SMO engine 406 may define an interface to enable the transporting of data between the multiple independent functional blocks. The SMO engine 406 also controls copying data across devices and maintains data coherence across the devices in the mobile network.

FIG. 5 is a flow chart 500 illustrating a process for implementing the Hi-PHY operation in the mobile network, according to an exemplary embodiment. The operations (502-512) may be controlled and/or executed by the Hi-PHY operation controller (440).

At step 502, a cloud-native microservice associated with Hi-PHY operations is configured. At step 504, based on the configuration, a baseband processing functional block is segregated or separated into multiple independent functional blocks. At step 506, based on the configured cloud-native microservice, the independent functional block is activated to provide the RAN service in the mobile network. At step 508, the deployment configuration request associated with controlling a processing functionality of the independent functional block is received. At step 510, the independent functional block in the mobile network is deployed. At step

512, the deployed independent functional block is executed to provide the Hi-PHY operation.

In an embodiment, the system and method described herein may provision implementing Hi-PHY operations in the mobile network using microservices-based architecture on heterogeneous multi-core processing nodes or heterogeneous compute platforms. The system and method described may facilitate an optimal mapping of microservices to each element of the processing node(s) or computing resources or computing elements to meet the defined optimization targets associated with the deployment constraints.

For example, consider a scheduling problem that may be defined as follows: The objective of the problem is solving a minimum completion time task criteria in a multiple-processor computing environment. For instance, let us consider the following parameters:

Parameters

If not stated otherwise, the following conventions are used in the following paragraphs:

$t, t_s, t_d = 1, 2, \ldots, T$: Total number of tasks. A task means only one instance of one task. If multiple instances of a task are required, then the number of tasks will increase accordingly. For example, if $Task_A$ has 3 instances, then the task count will be 3 ($\in \{1, 2, 3\}$) and not 1.

$p = 1, 2, \ldots, P$: Total number of compute elements or processors. Processors are considered in the smallest possible granular sense, such as a thread, core, etc.

Inputs $T_{et}(t)$: $t^{th}$ task execution time. The assumption is, in all processors, the task takes same time to execute.

$$S = \sum_t T_{et}(t)$$

$DT(t_s, t_d)$ Binary variable equals 1 if $s \neq d$ otherwise 0. This also indicates self-loop is not considered since we are dealing with Acyclic DAGs in this formulation.

Variables $T_c > 0$ is the total completion time of the whole DAG.

$T_{ET}(t) > 0$ End time of $t^{th}$ task $T_{ST}(t) > 0$ Start time of the $t^{th}$ task $TP(t, p) = 1$ if task $t_s$ runs on processor $p$, 0 otherwise $P(p)$ Binary variable, 1 if processor $p$ is used by any task else 0.

$Z(0, t, p)$ Binary variable, 1 if $t$ is the starting task in processor $p$, else 0.

$Z(t_s, t_d, p)$ Binary variable, 1 if task $t_s$ is processed before task $t_d$ on processor $p$, else 0

Objective

The objective of the scheduling algorithm is to minimize $T_c$

Constraints

Total completion time is always greater than any task end time.

Execution end time is equal to summation of start time and execution time. The data transfer times are accommodated in the execution times of the tasks.

Start time must be after end time of all the directly dependent tasks(s).

$$T_c \geq T_{ET}(t), \forall t \tag{1}$$

-continued                                            -continued $$\in T$$

$$T_{ET}(t) = T_{ST}(t) + T_{et}(t) - 1, \qquad (2)$$

$$\forall t \in T$$

$$T_{ST}(t) \geq DT(t_s, t) \cdot [T_{ET}(t_s) + 1] \qquad (3)$$

$$\forall t_s, t$$

$$\in T, t_s \neq t$$

All tasks must be assigned to only one processor.

A processor must be active if any task is running under at the processor.

$$\sum_p TP(t, p) = 1 \; \forall \, t \qquad (4)$$

$$\in P$$

$$\sum_t TP(t, p) \geq P(p) \; \forall \, p \qquad (5)$$

$$\in P$$

$$\sum_t TP(t, p) \leq T \cdot P(p) \; \forall \, p \qquad (6)$$

$$\in P$$

All active processors must have only (and only) starting task.

If a task is assigned to a processor, then the task must be in a (single linear) sequence in the processor.

Start time of tasks must be adjusted according to the task execution sequence.

$$\sum_t Z(0, t, p) = P(p) \; \forall \, p \qquad (7)$$

$$\in P$$

$$Z(t_s, t_d, p) \qquad (8)$$

$$\leq TP(t_s, p) \forall \, t_s, t_d \in T, p$$

$$\in p$$

$$Z(t_s, t_d, p) \qquad (9)$$

$$\leq TP(t_d, p) \; \forall \, t_s, t_d \in T, p$$

$$\in P$$

$$\sum_{t_s=0,1,2\ldots}^{T} Z(t_s, t_d, p) \qquad (10)$$

$$= TP(t_d, p) \; \forall \, T, p$$

$$\in P$$

$$\sum_{t_d} Z(t_s, t_d, p) \leq 1 \forall \, t_s \qquad (11)$$

$$\in [0, T], p \in P$$

$$[T_{ET}(t_s) + 1] - T_{ST}(t_d) \qquad (12)$$

$$\leq S \cdot [1 - Z(t_s, t_d, p)] \forall \, t_s, t_d$$

$$\in T, p \in P$$

$$-T_{ST}(t_d) \qquad (13)$$

$$\leq S \cdot Z(t_s, t_d, p) \forall \, t_s, t_d \in T, p$$

$$\in P$$

In an embodiment, the scheduling problem may be formulated as described above and may be solved using a mixed integer linear programming (MILP) solver. However, the time complexity is quite high (in several days) for a single configuration. Instead, heuristic-based mechanisms like Lowest Immediate Follower Exploration (LIFE) may be implemented. This mechanism explores immediate follower nodes and provision nodes, which have the overall lowest execution time value. The mechanism may allocate a task T, which can have single or multiple instances where each instance can be executed in parallel if required. It is to be noted that it requires an estimated run time of all the task instances. It operates at two levels: the top level (primary algorithm), which runs over each task to be scheduled, and the provisioning algorithm, which works at each processing element level.

After the scheduling passes on the DFG, it is clear which target compute element the task should be executed. The next step may insert the communication nodes before and after the tasks if the preceding and succeeding tasks are not on the same target. From this point onwards, several tools can seamlessly take this IR and generate machine code optimized for the target. We observe that certain platforms provide acceleration using special hardware units for performing certain operations over and above the vector units present on the compute engine. In an embodiment, the runtime environment enables the execution of the tasks dispatched on a specific compute element or group of elements. There are several methods to implement a job scheduler over multicore systems.

In an embodiment, the system and method described may provision the portability of Hi-PHY operations by separating or segregating the functionality and implementation aspects of each microservice. Additionally, this method enables the scalability of Hi-PHY operations by creating multiple instances of microservices to distribute the processing load efficiently. It further enables the dynamic implementation of Hi-PHY processing chains through the utilization of microservices.

Figure 6:
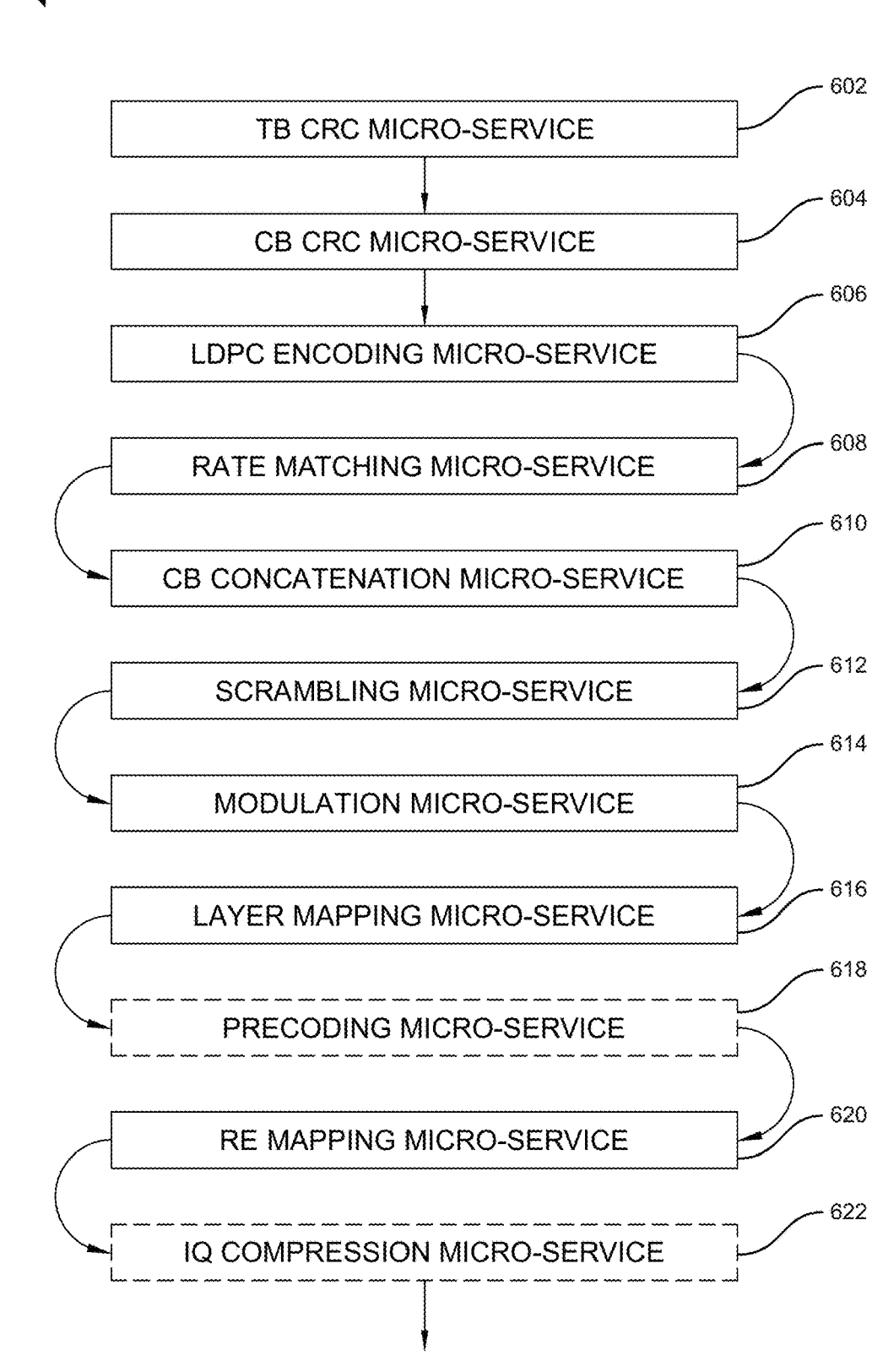
FIG. 6 is an illustration showing a framework that implements certain operations or functions of the O-RAN Hi-PHY as microservices, according to an exemplary embodiment.

FIG. 6 is an illustration showing a framework that implements certain operations or functions of the O-RAN Hi-PHY as microservices, according to an exemplary embodiment. FIG. 6 shows a framework that enables implementing the signal chain of processing functions or operations corresponding to the DL PDSCH as microservices. In an embodiment, each sub-function or sub-operation in the DL PDSCH may be decomposed into fungible units. For example, such fungible units may include an execution of, for example, a TB CRC attachment block, a code block (CB) segmentation block, a CB CRC attachment block, a LDPC encoding, a rate matching block, a CB concatenation block, a scrambling block, a modulation block, a layer mapping block, a precoding block, an IQ compensation block, etc.

In an embodiment, the decomposed fungible units may be deployed independently, and each fungible unit executes specific operations or functions. The implementation of functions or operations of the DL PDSCH as microservices enables deploying APIs to access or execute functions or operations of each fungible unit, thereby providing a harmonization of input and output for each fungible unit. Further, implementing functions or operations of the DL PDSCH as microservices enables stateless deployment such that the execution of function or operation by each fungible unit is decoupled and independent of the state of other fungible units. Further, the statelessness of the microservices eliminates the need for synchronization of states between fungible units. Additionally, the operations or functions executed by microservices may be scaled up or scaled down dynamically. In an embodiment, implementing functions or operations as microservices may enable publishing information related to computing resources and network consumption that may provision monitoring and metering of the resources. Further, implementing the operations or functions as microservices may enable the provisioning of a telemetry interface via a query interface. Such provisioning may enable telemetry data collection, which may further be used to optimize network operations.

In an embodiment, the implementation of operations or functions of Hi-PHY as microservices enables the functions or operations to be executed by any computing resource. For example, the computing resources may include general-purpose processors (GPPs), FPGAs, GPUs, single-core or multicore CPUs, network accelerator cards, etc., application-specific hardware or general-purpose CPU or GPU, or even extensions to ISA of a specific microservices.

In an embodiment, the microservices may define and specify the interface that provides flexibility in transporting data across different microservices. Such an arrangement may provision abstraction of services, thereby enabling sharing buffers to avoid copying data to automatic DMA transfers across devices and maintain data coherence. The platform or framework provision implementation of operations or functions of RAN service through flexible deployment of microservices, which can be implemented in software or hardware.

In an embodiment, the platform or architecture may enable operators to choose the RAN services based on their requirements and deploy the RAN services using an optimal combination of hardware and software components. Further, it may also enable the operator to optimize the overall system performance by effectively distributing the functions or operations of the microservices across different computing resources. For example, when a particular type of computing resource is overloaded, the functions or operations of the microservices could be run on a different type of computing resource.

At 602, the TB CRC micro-service detects an error in data and information transmitted over a mobile network. At 604, the CB CRC micro-service detects correctly decoded CB with certainty. At 606, the LDPC encoding micro-service represents a class of error-correcting codes that can be employed to correct transmission errors in the mobile network.

At 608, the rate-matching micro-service extracts an exact set of bits to be transmitted within a given Transmission Time Interval (TTI). Alternatively, the rate-matching micro-service adjusts the output bitrate at the LDPC encoder to match the rate offered by available resource elements within the TTI. At 610, A CB concatenation micro-service can refer to the bit sequences of all the CBs in a CB set connected in series. At 612, a scrambling micro-service is used to randomize transitions in a transmitted signal by shuffling bits.

At 614, the modulation micro-service enables the wireless connection to transmit signals to a longer distance. Alternatively, the modulation micro-service maps groups of input bits into the M-array symbol in constellation space as configured for the specified code block. At 616, a layer mapping micro-service is a process where each codeword is mapped to one or multiple layers. At 618, the precoding micro-service is a technique that exploits transmit diversity by weighting the information stream. At 620, the re-mapping micro-service enables re-mapping the data without error. Alternatively, the re-mapping micro-service maps symbols to resource elements. At 622, the IQ compression micro-service performs compression processing on the quantized IQ obtained by baseband processing.

Figure 7:
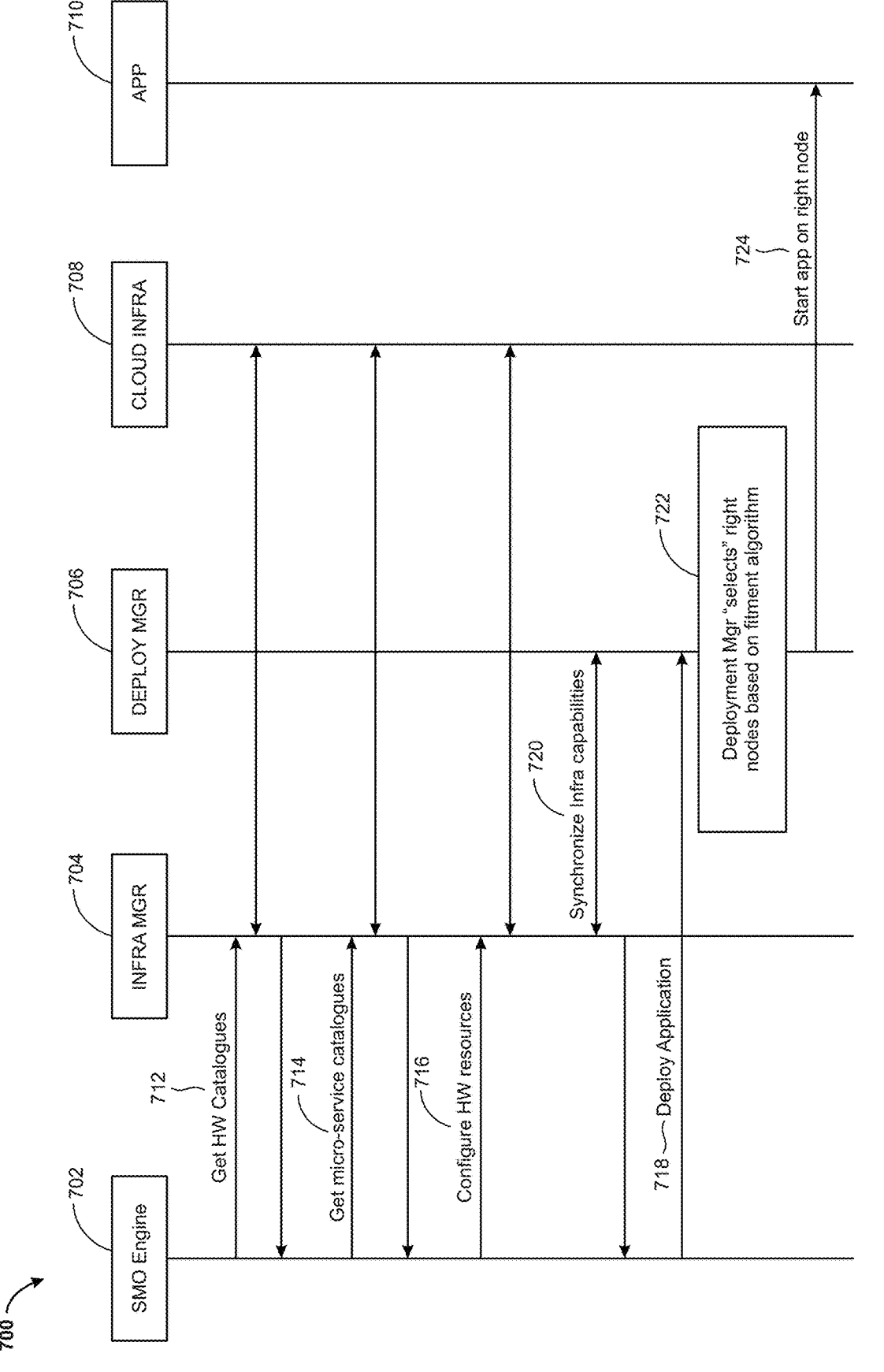
FIG. 7 is a block diagram 700 showing step-by-step operations of a signal flow diagram in the O-RAN Hi-PHY, according to an exemplary embodiment.

FIG. 7 is a block diagram 700 showing step-by-step operations of a signal flow diagram in the O-RAN Hi-PHY, according to an exemplary embodiment. In an embodiment, the signal flow diagram is shown in FIG. 7 depicts a flow of control and data between the components or modules (e.g., 702, 704, 706, 708, and 710). The components or modules may include a service management and orchestration (e.g., 702), platform management service (e.g., 704), deployment management service (e.g., 706), a RAN cloud (e.g., cloud infra 708), applications (e.g., App 710), network functions, software repositories, etc. In an embodiment, the DM 706 may include information related to the clusters with profile support and constraints. Further, the NF deployment artifact may include information related to profiles and constraints for profile execution. In an embodiment, the DM 706 may select the optimized computing resources to execute the given NF with the constraints on profiles. In an embodiment, an application may create profile instances, provide an association, and trigger the flow of events to process Hi-PHY's functions or operations.

At 712, the SMO 702 sends the request as "get HW catalogs" to the PM engine 704. Based on the get HW catalogs, the PM 704 and the cloud infrastructure engine 708 may exchange a response that may include vendor information, version information, Bios, etc. Further, the PM 704 sends the response, including vendor information, version information, Bios, etc., to the SMO 702.

At 714, the SMO 702 sends the request as "get micro-service catalogs" to the PM engine 704. Based on the get micro-service catalogs, the PM 704 and the cloud infrastructure engine 704 exchange a response including vendor information, version information, Bios, etc. The PM 704 sends the response, including vendor information, version information, Bios, etc., to the SMO 702.

At 716, the SMO 702 configures the HW resources at the PM engine 704. At 718, Synchronize infra capabilities are exchanged between the PM engine 704 and the DM engine 706. The platform management engine 704 sends the Synchronize infra capabilities to the SMO 702. Based on the Synchronized infra capabilities, at 720, the SMO engine 406 deploys the application at the DM engine 706. At 722, the DM engine 706 selects the right deployment nodes based on fitment techniques. At 724, the DM engine 706 starts the execution of the application on the right deployment node.

Figure 8:
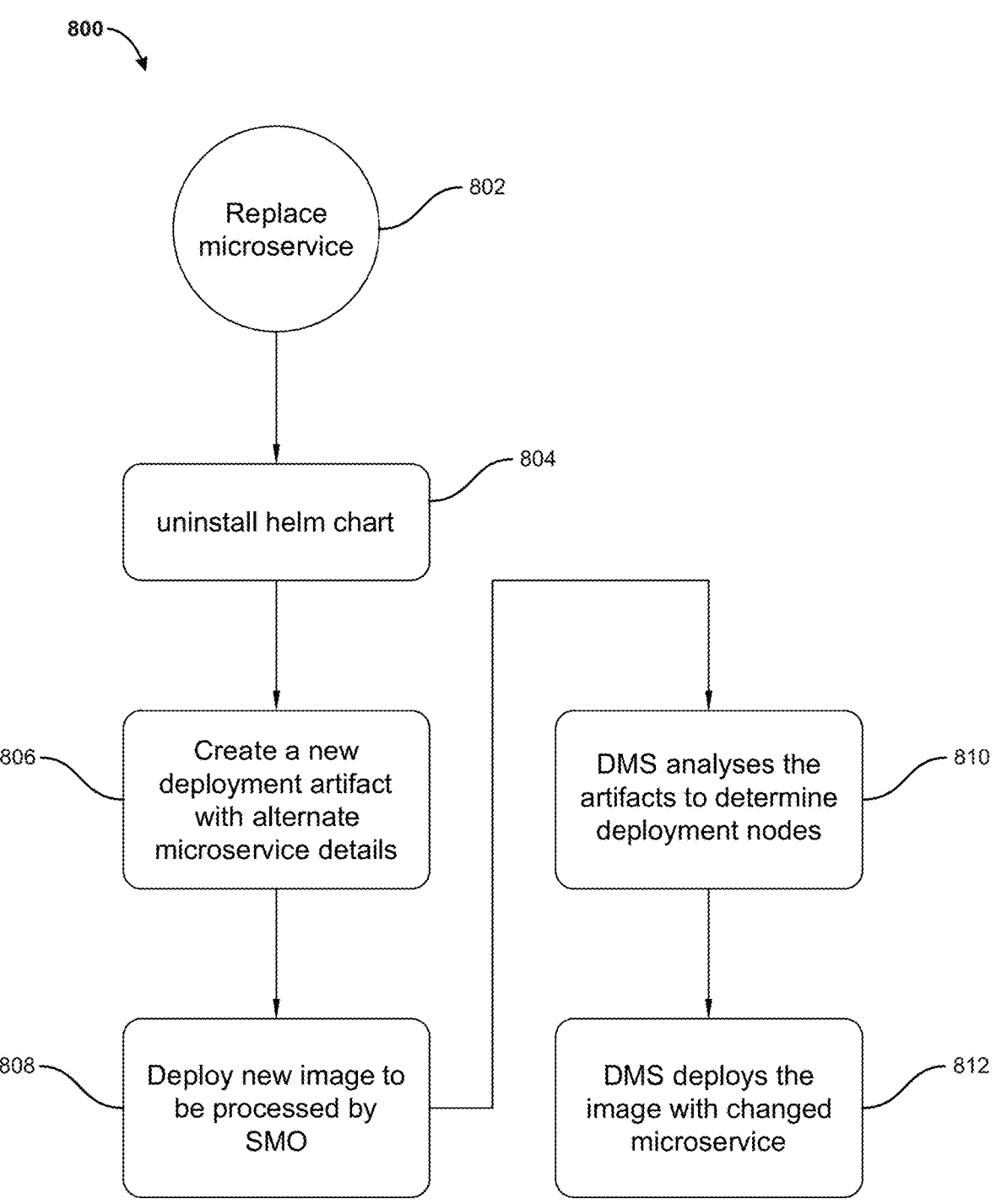
FIG. 8 is a flow diagram showing a process for replacing a microservice, according to an exemplary embodiment.

FIG. 8 is a flow diagram showing a process for replacing a microservice according to an exemplary embodiment. In an embodiment, the mechanism may include a step of uninstalling a helm chart. Further, the mechanism may include the step of creating a new deployment artifact with alternate microservice details. Further, the mechanism may include the step of deploying a new image to be processed by the SMO. Further, the mechanism may include the step of deploying the new image to be processed by SMO. Additionally, the mechanism may consist of the deployment management service (DM) step, which may analyze the artifacts to determine the deployment node. Further, the mechanism consists of the step of the DM deploying the image with a changed microservice.

At 802, the process includes receiving a request to replace the microservice. At 804, the process consists of uninstalling the helm chart upon receiving the request to replace the microservice. At 806, the method includes creating the new deployment artifact with alternate microservice details. At 808, the method comprises deploying new images to be processed by the SMO engine 406. At 810, the method includes analyzing the artifacts to determine deployment nodes using the DM 702*b*. At 812, the method comprises deploying the image with a changed microservice using the DM 702*b*.

Figure 9:
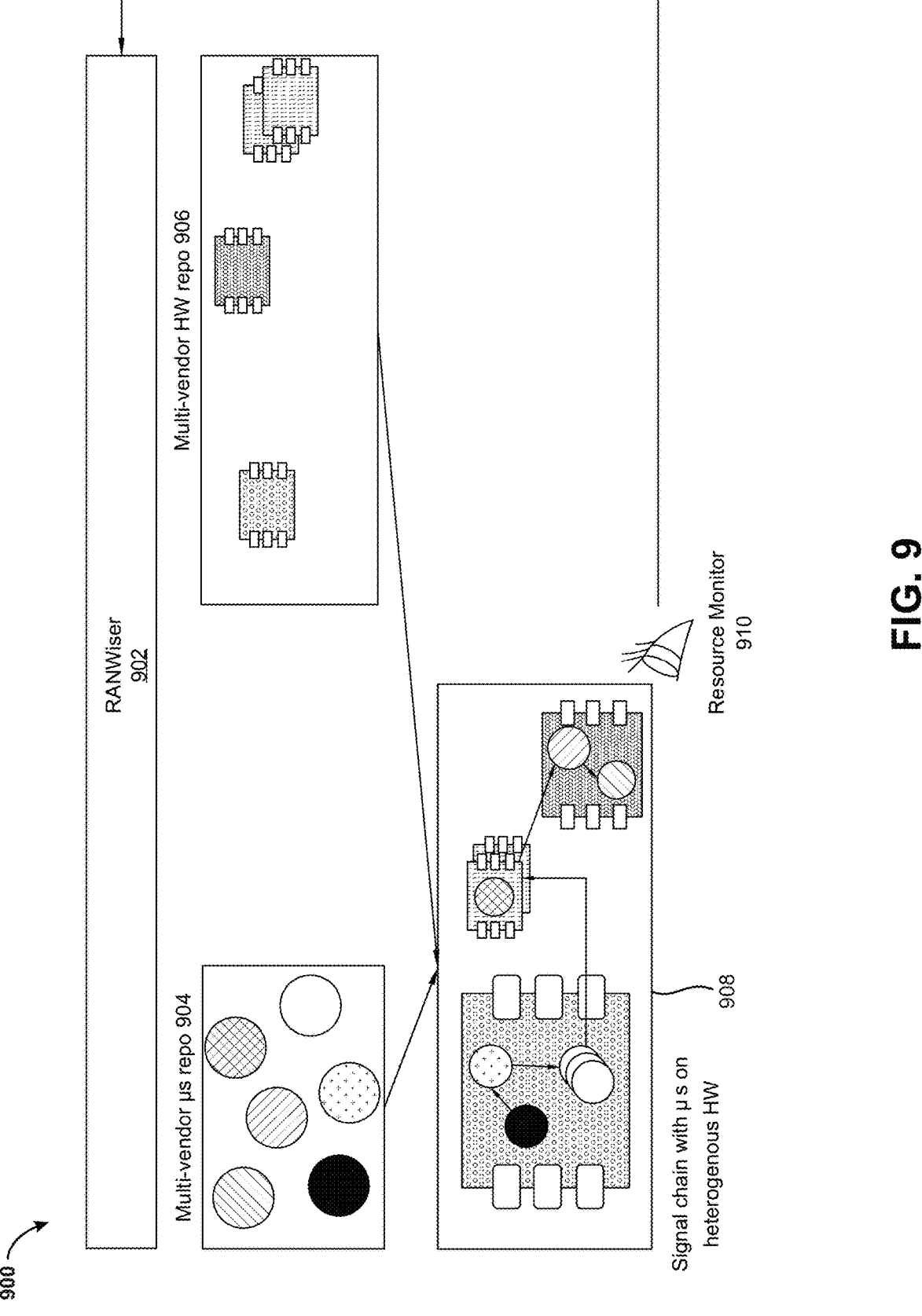
FIG. 9 is a block diagram illustrating a RAN marketplace, according to an exemplary embodiment.

FIG. 9 is a block diagram 900 illustrating a RAN marketplace, according to an exemplary embodiment. The RAN marketplace may include signal chain processing modules implemented as microservices on heterogeneous hardware platforms. Further, the RAN marketplace may consist of a RANWiser 902, a multi-vendor microservice repository 904, a resource monitor 910, and a multi-vendor hardware repository 906. Additionally, the functions or operations of RAN that may be provided as services may be implemented as microservices. Such a mechanism may establish a RAN marketplace that enables vendors to implement their unique, specialized, differentiated modular RAN functionality in the RAN marketplace. For example, a specific vendor may develop and provide a RAN service corresponding to a 'Channel Estimation' operation or function. Such vendors may use the RAN marketplace to sell the microservice related to Channel Estimation. An operator may procure the microservice (e.g., 908) from the vendor and plug it into their O-RAN Hi-PHY without changing any further architecture or deployment related to the RAN services. The RAN marketplace may provide flexibility and multiple deployment options for the telecom or mobile operator. Further, the RAN marketplace may provide the mobile operator with flexibility and various options for future upgrades with the deployment of RAN services. The RAN marketplace may additionally offer several economic benefits resulting from preventing vendor lock-ins and possibly enabling mobile operators to reduce their RAN infrastructure's total cost of ownership (TCO).

In an embodiment, static analyzers may be implemented to enable compliance or conformity of the microservices with the standard specifications. The static analyzers may additionally analyze the microservices to ensure compliance or accordance with interface specifications. Such an implementation of static analyzers may smoothen the onboarding process of vendors providing microservices and enable standardization of the CI/CD process for provisioning the microservices in the RAN marketplace.

Figure 10:
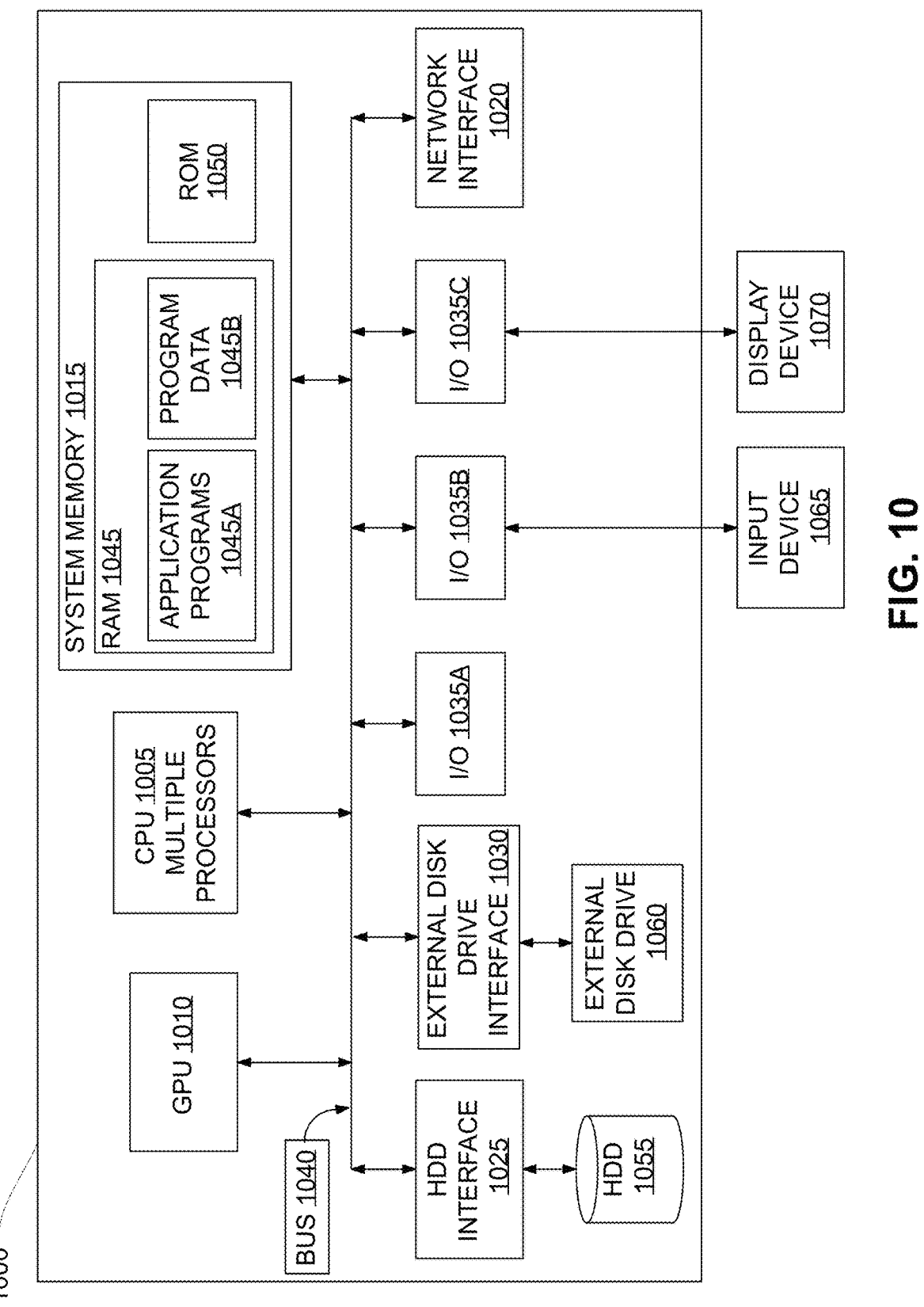
FIG. 10 shows an exemplary hardware configuration of a computer system (1000) that implements microservices of the O-RAN Hi-PHY, according to an exemplary embodiment.

FIG. 10 shows an exemplary hardware configuration of a computer system 1000 that implements microservices of the O-RAN Hi-PHY, according to an exemplary embodiment. The computer system 1000) includes a CPU 1005, a GPU 1010, a system memory 1015, a network interface 1020, a hard disk drive (HDD) interface 1025, an external disk drive interface 1030, and an input/output (I/O) interfaces (1035A, 1035B, 1035C). Computer elements are coupled to each other via the system bus 1040. The CPU 1005 may perform arithmetic, logic, and/or control operations by accessing the system memory 1015. The CPU 1005 may implement the processors of the exemplary devices and/or systems described above. The GPU 1010 may perform operations for processing graphics or AI tasks. In case a computer system 1000 is used to implement an exemplary central processing device, the GPU 1010 may be the GPU 1010 of the exemplary central processing device as described above. The computer system 1000 does not necessarily include the GPU 1010, for example, in case a computer 1000 is used for implementing a device other than a central processing device. The system memory 1015 may store information and/or instructions for use with the CPU 1005. The system memory 1015 may include volatile and non-volatile memory, such as random-access memory (RAM) 1045 and read-only memory (ROM) 1050. A basic input/output system (BIOS) containing the basic routines that help to transfer information between elements within the computer 1000, such as during start-up, may be stored in ROM 1050. The system bus 1040 may be any of several types of bus structures, including a memory bus or memory controller, a peripheral bus, and a local bus using various bus architectures.

The computer may include a network interface 1020 for communicating with other computers and/or devices via a network. Further, the computer may include a hard disk drive (HDD) 1055 for reading from and writing to a hard disk (not shown) and an external disk drive 1060 for reading from or writing to a removable disk (not shown). The removable disk may be a magnetic disk for a magnetic disk drive or an optical disk such as a CD ROM for an optical disk drive. The HDD 1055 and external disk drive 1060 are connected to the system bus 1040 by the HDD interface 1025 and external disk drive interface 1030, respectively. The drives and their associated non-transitory computer-readable media provide non-volatile storage of computer-readable instructions, data structures, program modules, and other data for the general-purpose computer. The computer-readable instructions may correspond to the mechanism for optimizing the allocation of computing resources dynamically determining network conditions.

Although the exemplary environment described herein employs a hard disk (not shown) and an external disk (not shown), it should be appreciated by those skilled in the art that other types of computer-readable media can store data that is accessible by a computer, such as magnetic cassettes, flash memory cards, digital video disks, random access memories, read-only memories, and the like, may also be used in the exemplary operating environment.

Several program modules may be stored on the hard disk, external disk, ROM 1050, or RAM 1045, including an operating system (not shown), one or more application programs 1045A, other program modules (not shown), and program data 1045B. The application programs may include at least a part of the functionality as described above.

The computer system 1000 may be connected to the input device 1065, such as a mouse and/or keyboard, and display device 1070, such as a liquid crystal display, via corresponding I/O interfaces 1035A to 1035C and the system bus 1040. In addition to an implementation using the computer system (1000), as shown in FIG. 10, a part or all the functionality of the exemplary implementations described herein may be implemented as one or more hardware circuits. Examples of such hardware circuits may include but are not limited to Large Scale Integration (LSI), Reduced Instruction Set Circuits (RISC), Application Specific Integrated Circuit (ASIC), and Field Programmable Gate Array (FPGA).

One or more implementations are now described with reference to the drawings, wherein like reference numerals are used to refer to like elements throughout. In the following description, numerous specific details are set forth to provide a thorough understanding of the various implementations. It is evident, however, that the various implementations can be practiced without these specific details (and without applying to any networked environment or standard).

As used in this application, in some implementations, the terms "component," "system," and the like are intended to refer to, or comprise, a computer-related entity or an entity related to an operational apparatus with one or more specific functionalities, wherein the entity can be either hardware, a combination of hardware and software, software, or software in execution. For example, a component may be a process running on a processor, an object, an executable, a thread of execution, computer-executable instructions, a program, and/or a computer. By way of illustration and not limitation, both an application running on a server and the server can be a component.

The various actions, acts, blocks, steps, or the like in the flow charts (S500, S600, and S800) may be performed in the order presented, in a different order, or simultaneously. Further, in some embodiments, some actions, acts, blocks, steps, or the like may be omitted, added, modified, skipped, or the like without departing from the scope of the present disclosure.

The above descriptions and illustrations of embodiments, including what is described in the Abstract, are not intended to be exhaustive or to limit one or more embodiments to the precise forms disclosed. While specific embodiments of, and examples for, one or more embodiments are described herein for illustrative purposes, various equivalent modifications are possible within the scope, as those skilled in the relevant art will recognize. These modifications can be made in light of the above-detailed description. Rather, the scope is to be determined by the following claims, which are to be interpreted in accordance with established doctrines of claim construction.

What is claimed is:

1. A method for implementing a high physical (Hi-PHY) layer operation in a mobile network, comprising:
   configuring one or more cloud-native microservices associated with one or more Hi-PHY operations in the mobile network;
   based on the configuration, segregating a plurality of baseband processing functional blocks into a plurality of independent functional blocks;
   activating one or more independent functional blocks from the plurality of independent functional blocks to provide one or more radio access network (RAN) operations in the mobile network;
   receiving one or more deployment configuration requests, wherein the one or more deployment configuration requests are associated with controlling one or more processing functionality blocks of the one or more independent functional blocks;
   based on the received deployment configuration requests, deploying the one or more independent functional blocks in the mobile network; and
   executing the deployed one or more independent functional blocks to enable executing one or more Hi-PHY operations in the mobile network.

2. The method of claim 1, wherein the plurality of baseband processing functional blocks correspond to one or more of a physical downlink shared channel (PDSCH), a PDSCH demodulation reference signals, a physical downlink control channel (PDCCH), a PDCCH demodulation reference signals, a physical broadcast channel, a primary synchronization signal, a secondary synchronization signal, a channel state information reference signal, and a phase tracking reference signal.

3. The method of claim 1, wherein configuring the one or more cloud-native microservices, comprises:

configuring a service management and orchestrator (SMO) engine for:
   instantiating a setting of platform runtime system (PRS) configuration between the SMO engine and a platform management (PM) engine;
   receiving a status of a success or a failure of the setting of PRS configuration;
   upon receiving an inventory update at the SMO engine, receiving a deployment artifact for a containerized workload at the SMO engine;
   based on the received deployment artifact, instantiating a network function (NF) via a deployment management (DM) engine;
   receiving the NF instantiated response success message from the DM engine when the DM engine initiates the NF instantiation via a network function engine; and
   instantiating a flow of events to execute one or more Hi-PHY operations.

4. The method of claim 1, wherein configuring the one or more cloud-native microservices, comprises:
   creating one or more deployment artifacts associated with the one or more cloud-native microservices;
   based on the created one or more deployment artifacts, deploying one or more images to be processed by the service management and orchestrator engine;
   determining one or more deployment nodes based on an analysis of the one or more deployment artifacts using the deployment management engine; and
   based on the analysis, deploying the one or more images with the cloud-native microservice, using the deployment management engine.

5. The method of claim 1, wherein configuring the one or more cloud-native microservices, comprises:
   determining one or more Hi-PHY operations based on a requirement of an operator;
   deploying the one or more Hi-PHY operations using an optimal usage of one or more resources; and
   configuring the one or more cloud-native microservices based on one or more determined Hi-PHY operations and one or more deployed Hi-PHY operations.

6. The method of claim 1, wherein controlling the one or more processing functionality blocks of independent functional blocks, comprises:
   receiving a channel information; and
   dynamically controlling the one or more processing functionality blocks of the one or more independent functional blocks, comprises:
      creating the one or more processing functionality blocks corresponding to the one or more independent functional blocks; and/or
      deleting the one or more processing functionality blocks corresponding to the one or more independent functional blocks; and/or
      scaling the one or more processing functionality blocks corresponding to the one or more independent functional blocks.

7. The method of claim 1, wherein the plurality of independent functional blocks are stateless, wherein the one or more independent functional blocks communicate with the plurality of independent functional blocks via an application programming interface.

8. The method of claim 1, further comprising:
   defining one or more interfaces to enable a transport of data between the plurality of independent functional blocks; and controlling copying of the data across a plurality of devices in the mobile network; and maintaining coherence of the data between the plurality of devices in the mobile network.

9. The method of claim 1, wherein the one or more independent functional blocks are deployed in one or more deployment nodes in the mobile network.

10. A system for implementing a high physical (Hi-PHY) layer operation in a mobile network, comprises:

processor; and a memory storing instructions which when executed by the processor, causes the system to:

configure one or more cloud-native microservices associated with one or more Hi-PHY operations in the mobile network;

based on the configuration, segregate a plurality of baseband processing functional blocks into a plurality of independent functional blocks;

activate one or more independent functional blocks from the plurality of independent functional blocks to provide one or more radio access network (RAN) operations in the mobile network;

receive one or more deployment configuration requests, wherein the one or more deployment configuration requests are associated with controlling one or more processing functionality blocks of the one or more independent functional blocks;

based on the received deployment configuration requests, deploy the one or more independent functional blocks in the mobile network; and execute the deployed one or more independent functional blocks to enable executing one or more Hi-PHY operations in the mobile network.

11. The system of claim 10, wherein the plurality of baseband processing functional blocks correspond to one or more of a physical downlink shared channel (PDSCH), a PDSCH demodulation reference signals, a physical downlink control channel (PDCCH), a PDCCH demodulation reference signals, a physical broadcast channel, a primary synchronization signal, a secondary synchronization signal, a channel state information reference signal, and a phase tracking reference signal.

12. The system of claim 10, wherein configuring the one or more cloud-native microservices, comprises:

configuring a service management and orchestrator (SMO) engine for:

instantiating a setting of platform runtime system (PRS) configuration between the SMO engine and a platform management (PM) engine;

receiving a status of a success or a failure of the setting of PRS configuration;

upon receiving an inventory update at the SMO engine, receiving a deployment artifact for a containerized workload at the SMO engine;

based on the received deployment artifact, instantiating a network function (NF) via a deployment management (DM) engine;

receiving the NF instantiated response success message from the DM engine when the DM engine initiates the NF instantiation via a network function engine; and instantiating a flow of events to execute one or more Hi-PHY operations.

13. The system of claim 10, wherein configuring the one or more cloud-native microservices, comprises:

creating one or more deployment artifacts associated with the one or more cloud-native microservices;

based on the created one or more deployment artifacts, deploying one or more images to be processed by the service management and orchestrator engine;

determining one or more deployment nodes based on an analysis of the one or more deployment artifacts using the deployment management engine; and based on the analysis, deploying the one or more images with the cloud-native microservice, using the deployment management engine.

14. The system of claim 10, wherein configuring the one or more cloud-native microservices, comprises:

determining one or more Hi-PHY operations based on a requirement of an operator;

deploying the one or more Hi-PHY operations using an optimal usage of one or more resources; and configuring the one or more cloud-native microservices based on one or more determined Hi-PHY operations and one or more deployed Hi-PHY operations.

15. The system of claim 10, wherein controlling the one or more processing functionality blocks of independent functional blocks, comprises:

receiving a channel information; and dynamically controlling the one or more processing functionality blocks of the one or more independent functional blocks, comprises:

creating the one or more processing functionality blocks corresponding to the one or more independent functional blocks; and/or deleting the one or more processing functionality blocks corresponding to the one or more independent functional blocks; and/or scaling the one or more processing functionality blocks corresponding to the one or more independent functional blocks.

16. The system of claim 10, wherein the plurality of independent functional blocks are stateless, wherein the one or more independent functional blocks communicate with the plurality of independent functional blocks via an application programming interface.

17. The system of claim 10, further comprises:

define one or more interfaces to enable a transport of data between the plurality of independent functional blocks; and control copying of the data across a plurality of devices in the mobile network, and maintain coherence of the data between the plurality of devices in the mobile network.

18. The system of claim 10, wherein the one or more independent functional blocks are deployed in one or more deployment nodes in the mobile network.

* * * * *